United States Patent
Rumanowski

[15] 3,697,658
[45] Oct. 10, 1972

[54] PROCESS FOR THE CONTROL OF PESTS WITH N,N'-BIS(HALOACETYL)-4,5-SUBSTITUTED-O-PHENYLENE DIAMINES

[72] Inventor: Edmund J. Rumanowski, Dover, N.J.

[73] Assignee: Tenneco Chemicals, Inc.

[22] Filed: Sept. 23, 1970

[21] Appl. No.: 74,936

Related U.S. Application Data

[62] Division of Ser. No. 677,853, Oct. 25, 1967, Pat. No 3,557,211.

[52] U.S. Cl. .............424/324, 424/304, 424/311
[51] Int. Cl. .....................A01n 9/20, A01n 9/24
[58] Field of Search...................424/304, 324, 311

[56] References Cited

OTHER PUBLICATIONS

Chem Abst Vol 52 Col. 7179 (Cho-Tung Tu et al.).
Chem Abst. Vol. 52 Col. 12211 (Tricerri et al.).

Primary Examiner—Jerome D. Goldberg
Assistant Examiner—Allen J. Robinson
Attorney—Daniel J. Reardon, Barry G. Magidoff and Evelyn Berlow

[57] ABSTRACT

Compounds having the structural formula

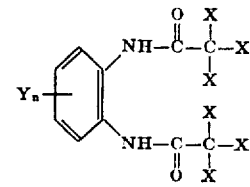

wherein each X represents hydrogen, chlorine, or fluorine; each Y represents halogen, lower alkyl, lower alkoxy, cyano, trifluoromethyl, or nitro; and $n$ represents an integer in the range of zero to four are useful in the control of the growth of fungi, insects, and mites. Illustrative of these compounds are N,N'-bis(trichloroacetyl)-4,5-dichloro-o-phenylene diamine, N,N'-bis(chloroacetyl)-4,5-dichloro-o-phenylene diamine, and N,N'-bis(trifluoroacetyl)-3,4,5-tribromo-o-phenylene diamine.

7 Claims, No Drawings

PROCESS FOR THE CONTROL OF PESTS WITH N,N'-BIS(HALOACETYL)-4,5-SUBSTITUTED-O-PHENYLENE DIAMINES

This is a division of my copending application Ser. No. 677,853, which was filed on Oct. 25, 1967 which is now U.S. Pat. No. 3,557,211.

This invention relates to pesticidal compositions and to their use in the control of various plant and animal pests. More particularly, it relates to the use in the control of the growth of undesirable fungi, insects, and mites of pesticidal compounds that contain substituted N,N'-bis(halocetyl)-o-phenylene diamines as their active ingredient.

In accordance with this invention, it has been discovered that certain substituted N,N'-bis(acetyl)-o-phenylene diamines have unusual and valuable activity as fungicides, as insecticides, and as miticides. These compounds may be represented by the structural formula

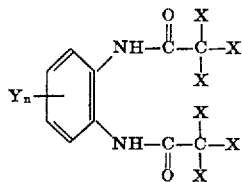

wherein each X represents hydrogen, chlorine, or fluorine; each Y represents chlorine, bromine, iodine, fluorine, an alkyl group having one to four carbon atoms, an alkoxy group having one to four carbon atoms, a cyano group, a trifluoromethyl group, or a nitro group; and $n$ represents an integer in the range of zero to four. The preferred composition for use as pesticides are those in which at least two and preferably four or more of the X substituents represent chlorine or fluorine and the Y substituents represent chlorine or bromine atoms in the 4 and 5 positions of the aromatic ring. Illustrative of these compounds are N,N'-bis(trichloroacetyl)-4,5-dichloro-o-phenylene diamine, N,N'-bis(chloroacetyl)-4,5-dichloro-o-phenylene diamine, N,N'-bis(trifluoroacetyl)-4,5-dibromo-o-phenylene diamine, N,N'-bis(difluorochloroacetyl)-3,4,5-trichloro-o-phenylene diamine, and the like.

The substituted N,N'-bis(haloacetyl)-o-phenylene diamines of this invention may be prepared by any suitable and convenient procedure. For example, they may be prepared by reacting the appropriate o-phenylene diamine with a substantially equivalent amount of acetyl chloride, a haloacetyl chloride, acetic anhydride, a haloacetic anhydride, or a mixture of these compounds. If desired, an excess of about 5 percent to 30 percent of the acetyl chloride or the acetic anhydride may be used. The reaction may be carried out in the absence of a solvent or in the presence of a hydrocarbon or ether, such as heptane, toluene, xylene, or isopropyl ether. Particularly satisfactory results have been obtained by mixing an o-phenylene diamine with a slight excess of a haloacetic anhydride, such as trifluoroacetic anhydride, at a temperature below about 40° C. and then heating the mixture at a temperature in the range of about 60° to 100° C. and until the reaction has been completed.

The pesticides of this invention may be applied to a wide variety of insects, fungi, and other pests to control or inhibit their growth. While each of the compounds having the aforementioned structure has been found to be useful in the control of certain of the pests, the particular type of organism upon which each exerts its major effect is largely dependent upon the number and the nature of the substituents on the aromatic ring and/or on the acetyl groups. Thus it has been found that N,N'-bis(trifluoroacetyl)-4-methyl-o-phenylene diamine is most effective as a soil fungicide, while N,N'-bis(trifluoroacetyl)-4,5-dichloro-o-phenylene diamine is valuable as a fungicide and as an insecticide. The locus in which pest control is to be effected may, if desired, be treated with the compounds of this invention. Alternatively, these compounds may be applied directly to the undesirable organisms to control or inhibit their growth.

While the substituted N,N'-bis(halocetyl)-o-phenylene diamines may be used as such in the processes of this invention, they are usually and preferably used in combination with an inert carrier that facilitates the dispensing of dosage quantities of the pesticide and assists in its absorption by the organism whose growth is to be controlled. The pesticidal compounds may be mixed with or deposited upon inert particulate solids, such as fuller's earth, talc, diatomaceous earth, hydrated calcium silicate, kaolin, and the like to form dry particulate compositions. Such compositions may, if desired, be dispersed in water with or without the aid of a surface-active agent. The pesticidal compounds are preferably dispensed in the form of solutions or dispersions in inert organic solvents, water, or mixtures of inert organic solvents and water or as oil-in-water emulsions. The concentration of the substituted N,N'-bis(haloacetyl)-o-phenylene diamines in the pesticidal compositions may vary within wide limits and depends upon a number of factors, the most important of which are the type or types of organisms being treated and the rate at which the composition is to be applied. In most cases the composition contains approximately 0.1 percent to 85 percent by weight of one or more of the aforementioned substituted N,N'-bis(haloacetyl)-o-phenylene diamines. If desired, other pesticidal compounds may also be present in the compositions. The amount of the composition that is used is that which will provide the desired inhibition or control of the growth of the pests.

The invention is illustrated by the examples that follow. In these examples, all percentages are percentages by weight.

EXAMPLE 1

To a mixture of 8.9 grams (0.05 mole) of 4,5-dichloro-o-phenylene diamine and 100 ml. of toluene at 60°–65° C. was added 18.2 grams (0.1 mole) of trichloroacetyl chloride over a period of 10 minutes. The reaction mixture was heated at its reflux temperature for 6 hours, cooled to room temperature, and filtered. The crude product was washed with 25 ml. of toluene, then with 25 ml. of petroleum ether (20°–40° C.) and dried. There was obtained a 74 percent yield of N,N'-bis(trichloroacetyl)-4,5-dichloro-O-phenylene diamine, which melted at 240°–242° C. and which contained 59.4 percent Cl, 5.96 percent N, 25.3 percent C, and 0.83 H (calculated, 60.7 percent Cl, 6.0 percent N, 25.6 percent C, and 0.85 percent H). Infrared analysis of the product indicated that it contained the amide function.

EXAMPLE 2

A mixture of 8.9 grams (0.05 mole) of 4,5-dichloro-o-phenylene diamine, 11.1 grams (0.11 mole) of triethylamine, and 100 ml. of ethanol was maintained at 0° C. to 10° C. while 12.4 grams (0.11 mole) of chloroacetyl chloride was added to it over a period of 10 minutes. The reaction was warmed to room temperature, diluted with three times its volume of water, and filtered. The product obtained was recrystallized from ethanol. The N,N'-bis(chloroacetyl)-4,5-dichloro-o-phenylene diamine obtained melted at 153°–154° C. and contained 42.9 percent Cl, 8.49 percent N, 37.7 percent C, and 2.44 percent H (calculated, 43.0 percent Cl, 8.48 percent N, 36.4 percent C, and 2.42 percent H).

EXAMPLE 3

Twenty-five grams (0.12 mole) of trifluoroacetic anhydride was added to 8.9 grams (0.05 mole) of 4,5-dichloro-o-phenylene diamine over a period of 10 minutes during which the temperature of the mixture was not allowed to exceed 40° C. The reaction mixture was heated for 1 hour at 75°–80° C., cooled to room temperature, diluted with three times its volume of water, and filtered. The product was recrystallized from chloroform. The N,N'-bis-(trifluoroacetyl)-4,5-dichloro-o-phenylene diamine obtained melted at 155°–157° C. and contained 21.6 percent Cl, 7.4 percent N, 33.2 percent C, and 1.00 percent H (calculated, 19.2 percent Cl, 7.6 percent N, 32.5 percent C, and 1.08 percent H).

EXAMPLES 4–18

Using the procedures described in Examples 1–3, a series of substituted N,N'-bis(acetyl)-o-phenylene diamines were prepared. The compounds prepared, the method used, and the properties of the products are set forth in Table I.

EXAMPLE 19

Acetone solutions were prepared by dissolving 100 mg. portions of the products of Examples 1–18 in 10 ml. portions of acetone that contained 2000 ppm. of sorbitan trioleate and 5000 ppm. of a polyoxyethylene ether of sorbitan monooleate. The acetone solutions were dispersed in 90 ml. portions of distilled water to form aqueous solutions that contained 0.1 percent of the substituted N,N'-bis(haloacetyl)-o-phenylene diamine.

EXAMPLE 20

Separate lots of sterilized soil were inoculated with plant pathogens. The inoculated soil was placed in 4-ounce containers, and the soil in each container was drenched with 30 ml. of an aqueous suspension containing an amount of the test compound sufficient to provide the desired dosage rate. After incubation for 2 days at 70° F., the amount of mycelial growth on the surface of the soil was noted. The results of the tests are given in Table II. In this table, a rate of "1" indicates growth equal to that in inoculated soil that had not been treated with a fungicide; "2" indicates that about 75 percent of the surface was covered with colonies of the organism; "3" indicates that about 50 percent of the surface was covered with colonies of the organism; "4" indicates that a few scattered colonies were present; and "5" indicates no growth on the surface of the soil.

TABLE II
Activity of Substituted N,N'-bis(haloacetyl)-o-phenylene Diamines as Soil Fungicides

| Pesticide | Rate of Application (lbs./acre) | Sclerotium rolfsii | Pythium Sp. | Rhizoctonia solani | Fusarium oxysporum |
|---|---|---|---|---|---|
| Product of Ex. 2 | 300 | 4 | 1 | 1 | 3 |
|  | 150 | 3 | — | — | — |
|  | 75 | 3 | — | — | — |
|  | 37 | 2 | — | — | — |
| Product of Ex. 3 | 300 | 5 | 5 | 5 | 3 |
|  | 150 | 4 | 4 | 4 | — |
|  | 75 | 4 | 3 | 4 | — |
|  | 37 | 3 | 3 | 2 | — |
| Product | 300 | 5 | 5 | 5 | 3 |

TABLE I

| Ex. No. | Compound | Method of preparation | Yield, percent | Melting point, °C. | Cl Found | Cl Calc. | N Found | N Calc. | C Found | C Calc. |
|---|---|---|---|---|---|---|---|---|---|---|
| 4 | N,N'-bis(acetyl)-4,5-dichloro-o-phenylene diamine | Ex. 3 | 89 | ¹ 254–255 | 27.1 | 27.2 | 10.8 | 10.7 | 45.7 | 46.0 |
| 5 | N,N'-bis(dichloroacetyl)-4,5-dichloro-o-phenylene diamine | Ex. 1 | 85 | 210–211 | 53.2 | 53.4 | 7.14 | 7.0 | 31.1 | 30. |
| 6 | N,N'-bis(difluorochloro)-4,5-dichloro-o-phenylene diamine | Ex. 3 | 84 | 144–146 | 34.4 | 35.3 | 7.45 | 6.97 | 31.5 | 29.9 |
| 7 | N,N'-bis(trichloroacetyl)-4,5-dimethyl-o-phenylene diamine | Ex. 1 | 81 | ¹ 253–255 | 48.3 | 49.9 | 6.68 | 6.56 | 34.9 | 33.7 |
| 8 | N,N'-bis(trifluoroacetyl)-4,5-dimethyl-o-phenylene diamine | Ex. 3 | 82 | 168–170 |  |  | 8.48 | 8.54 | 43.8 | 43.6 |
| 9 | N,N'-bis(trichloroacetyl)-4-chloro-o-phenylene diamine | Ex. 1 | 72 | 220–221 | 56.7 | 57.4 | 6.48 | 6.47 | 27.4 | 27.7 |
| 10 | N,N'-bis(trifluoroacetyl)-4-chloro-o-phenylene diamine | Ex. 3 | 88 | 129–130 |  |  | 8.33 | 8.36 | 35.5 | 35.8 |
| 11 | N,N'-bis(trifluoroacetyl)-4-nitro-o-phenylene diamine | Ex. 3 | 60 | 102–112 |  |  | 12.4 | 12.2 | 35.0 | 34.8 |
| 12 | N,N'-bis(trifluoroacetyl)-4-methoxy-o-phenylene diamine | Ex. 3 | 78 | ¹ 133–134 |  |  | 8.19 | 8.50 | 39.8 | 40.0 |
| 13 | N,N'-bis(trifluoroacetyl)-4-methyl-o-phenylene diamine | Ex. 3 | 93 | 134–136 |  |  | 8.94 | 8.9 | 42.2 | 42.0 |
| 14 | N,N'-bis(trifluoroacetyl)-4-carboxy-o-phenylene diamine | Ex. 3 | 60 |  |  |  | 7.95 | 8.14 | 38.1 | 38.3 |
| 15 | N,N'-bis(trichloroacetyl)-o-phenylene diamine | Ex. 1 | 90 | 233–234 | 53.3 | 53.4 |  |  |  |  |
| 16 | N,N'-bis(trifluoroacetyl)-o-phenylene diamine | Ex. 3 | 83 | 157–159 |  |  | 9.09 | 9.33 |  |  |
| 17 | N,N'-bis(trifluoroacetyl)-3-nitro-o-phenylene diamine | Ex. 3 | 66 | 251–253 |  |  | 12.0 | 12.2 | 34.4 | 34.8 |
| 18 | N,N'-bis(trifluoroacetyl)-3-nitro-5-chloro-o-phenylene diamine | Ex. 3 | 70 | 166–169 | 11.4 | 9.3 | 13.6 | 11.1 | 33.5 | 31.6 |

¹ Decomposition.

| pesticide | rate of application ppm | Mexican Bean Beetle | Southern Armyworm | aphid | House-fly | 2-Spotted Spider Mite |
|---|---|---|---|---|---|---|
| of Ex. 4 | 150 | 2 | 1 | | 1 | 1 |
| Product of Ex. 5 | 300 | 1 | 5 | | 3 | 3 |
| Product of Ex. 6 | 300 | 5 | 3 | | 4 | 2 |
|  | 150 | 3 | — | | 1 | — |
| Product of Ex. 7 | 300 | 1 | 5 | | 3 | 1 |
| Product of Ex. 10 | 300 | 5 | 5 | | 5 | 4 |
|  | 150 | 5 | 5 | | 5 | 4 |
|  | 75 | 5 | 4 | | 4 | 1 |
|  | 37 | 4 | 3 | | 3 | 1 |
| Product of Ex. 12 | 300 | 5 | 4 | | 1 | 1 |
| Product of Ex. 13 | 300 | 5 | 5 | | 5 | '1 |
|  | 150 | 5 | 4 | | 1 | — |
|  | 75 | 3 | 3 | | 1 | — |
| Product of Ex. 15 | 300 | 1 | 5 | | 3 | 3 |
| Product of Ex. 16 | 300 | 5 | 5 | | 1 | 1 |
|  | 150 | 4 | 1 | | — | — |
|  | 75 | 2 | 1 | | — | — |
| Product of Ex. 18 | 300 | 5 | 5 | | 5 | 5 |
|  | 150 | 5 | 5 | | 5 | 5 |
|  | 75 | 5 | 4 | | 5 | 4 |
|  | 37 | 4 | 1 | | 4 | 2 |

EXAMPLE 21

In a series spider experiments in which the substituted N,N'-bis(haloacetyl)-o-phenylene diamines were applied to plants infested with Mexican bean beetles, Southern armyworms, aphids, houseflies, and 2-spotted spiders mites, the results summarized in Tale III were obtained. In no case was there appreciable damage to the plants.

TABLE III

Activity of Substituted N,N'-bis(haloacetyl)-o-phenylene Diamines as Insecticides

| pesticide | rate of application ppmtle | Mexican Bean Beetle | Southern Armyworm | aphid | House-fly | 2-Spotted Spider Mite |
|---|---|---|---|---|---|---|
| Product of ex. 1 | 1000 | 0 | 0 | 80 | 100 | 0 |
|  | 250 | — | — | 50 | 100 | — |
|  | 100 | — | — | 0 | 100 | — |
|  | 50 | — | — | — | 100 | — |
|  | 12.5 | — | — | — | 100 | — |
| Product of ex. 2 | 1000 | 100 | — | 0 | 80 | 0 |
| Product of ex. 3 | 1000 | 0 | 100 | 100 | 100 | 100 |
|  | 250 | — | 0 | 100 | 100 | 100 |
|  | 50 | — | — | 65 | 15 | 80 |
| Product of ex. 4 | 1000 | 80 | 0 | 50 | 100 | 0 |
|  | 250 | — | — | — | 100 | 0 |
|  | 50 | — | — | — | 80 | — |
| Product of ex. 5 | 1000 | 0 | 0 | 0 | 100 | 0 |
|  | 250 | — | — | — | 100 | — |
|  | 50 | — | — | — | 5 | — |
| Product of ex. 6 | 1000 | 0 | 0 | 100 | 100 | 30 |
|  | 500 | — | — | 90 | 70 | — |
|  | 250 | — | — | 90 | 50 | — |
|  | 50 | — | — | 50 | 5 | — |
| Product of ex. 7 | 250 | — | — | — | 100 | — |
|  | 50 | — | — | — | 35 | — |
| Product of ex. 8 | 1000 | 80 | 0 | 100 | 100 | 100 |
| Product of ex. 10 | 1000 | 0 | 0 | 25 | 100 | 80 |
|  | 250 | — | — | — | 85 | — |
| Product of ex. 12 | 1000 | 0 | 0 | 0 | 100 | 0 |
| Product of ex. 13 | 1000 | 0 | 0 | 0 | 100 | 0 |
| Product of ex. 16 | 1000 | 0 | 0 | 25 | 100 | 0 |
| Product of ex. 18 | 1000 | 80 | 0 | 100 | 100 | 100 |
|  | 250 | 90 | — | — | — | 100 |
|  | 50 | 20 | — | — | — | 65 |

Each of the other substituted N,N'-bis(haloacetyl)-o-phenylene diamines disclosed can be used in a similar manner to control or inhibit the growth of fungi, insects, and mites.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. A process for the control of the growth of pests selected from the group consisting of fungi, insects, and mites which comprises applying to said pests a pesticidally effective amount of a compound having the structural formula

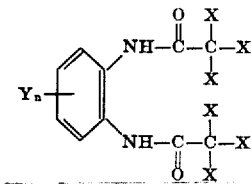

wherein each X represents hydrogen, chlorine, or fluorine; Y represents chlorine, lower alkyl, lower alkoxy, carboxy, or nitro; and $n$ represents an integer in the range of zero to two.

2. The process of claim 1 wherein the pesticidal compound has the structural formula

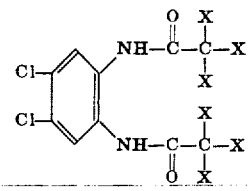

wherein each X represents hydrogen, chlorine, or fluorine.

3. The process of claim 2 wherein the pesticidal compound is N,N'-bis(chloroacetyl)-4,5-dichloro-o-phenylene diamine.

4. The process of claim 2 wherein the pesticidal compound is N,N'-bis(trichloroacetyl)-4,5-dichloro-o-phenylene diamine.

5. The process of claim 2 wherein the pesticidal compound is N,N'-bis(trifluoroacetyl)-4,5-dichloro-o-phenylene diamine.

6. The process of claim 2 wherein the pesticidal compound is N,N'-bis(difluorochloroacetyl)-4,5-dichloro-o-phenylene diamine.

7. The process of claim 1 wherein the pesticidal compound is N,N'-bis(trifluoroacetyl)-4,5-dimethyl-o-phenylene diamine.

* * * * *